United States Patent [19]

Alden

[11] Patent Number: 4,960,977
[45] Date of Patent: Oct. 2, 1990

[54] INFRA-RED BAKING OVEN

[75] Inventor: Lorne B. Alden, Shelburne, Vt.

[73] Assignee: G. S. Blodgett Co., Inc., Burlington, Vt.

[21] Appl. No.: 340,747

[22] Filed: Apr. 20, 1989

[51] Int. Cl.⁵ .............................. F24C 7/04; F27B 9/16
[52] U.S. Cl. ..................................... 219/388; 219/411
[58] Field of Search ............... 219/388, 214, 405, 411, 219/354; 99/390, 421 V, 479

[56] References Cited

U.S. PATENT DOCUMENTS

| | | | |
|---|---|---|---|
| 784,854 | 3/1905 | Grace | 219/388 |
| 2,156,860 | 5/1939 | Lucas | 99/421 V |
| 2,893,307 | 7/1959 | Rodriquez | 99/421 V |
| 3,204,549 | 9/1965 | Palowsky | 219/388 |
| 3,238,863 | 3/1966 | Beasley | 99/390 |

*Primary Examiner*—Teresa J. Walberg
*Attorney, Agent, or Firm*—Lowe, Price, LeBlanc, Becker & Shur

[57] ABSTRACT

An infra-red oven for cooking food at low wattage and with infra-red radiation having a wavelength of 3–6 micron is disclosed. The oven includes a rotatable turntable with a lower infra-red emitter disposed below the turntable and an upper infra-red emitter disposed above the turntable in a vertically moveable shroud. Opposed side emitters are deposed on either side of the turntable to cook the sides of the food. To utilize the oven the shroud is raised and food is placed on the turntable. The shroud is then lowered until the upper emitter is about 1.5 inches above the food and the turntable is rotated. Rotation continues as radiation is directed on to the lower and upper surfaces and the sides until the food is cooked.

9 Claims, 2 Drawing Sheets

INFRA-RED BAKING OVEN

TECHNICAL FIELD

This invention relates to an improved baking oven which uses infra-red radiation as the source of sensible heat to the food product. The invention further relates to an oven suitable for tabletop operation to cook individual food product items such as pizza pies or the like, and finally, this invention relates to a baking oven in which heating elements are selectively controlled to generate infra-red radiation of a desired wavelength and a low wattage for efficient baking.

BACKGROUND OF THE INVENTION

Ovens for many years have used infra-red radiation with usually poor efficiency. Conventional ovens, as is known, utilize a single rod type heating element in the bottom thereof which provides some energy to the lower surface of the food to be cooked but generally cooks by heating the air within the oven. A prolonged preheat time is necessary in order to heat the oven walls which in turn causes convective heating of the air within the oven cavity.

It has been known to provide ovens with separately controlled radiant heating elements disposed above and below the food to be cooked. See, for example, U.S. Pat. No. 4,164,643. In that patent two relatively low wattage and low temperature radiant elements were used and the elements were controlled to operate at optimum wattage settings for various foods. The interior of that oven utilized a shiny aluminum surface to maximize radiation, and the food was preferably baked in a baking container having a blackened outer surface to increase conductivity.

In U.S. Pat. No. 3,249,741 it was recognized that control of the wavelength of the infra-red radiation generated in a baking oven was necessary or desirable. The patent described in general that the longer wavelengths achieved greater penetration before the radiant energy was transformed into sensible heat whereas the shorter wavelengths could exhibit and undesirable crusting on the food product. The patent further describes that the wavelengths and depths of penetration through the products surface layers are inversely related to the temperature of the emitting source and in general described cooking at wavelengths primarily in the ultralong wavelength area of 30–400 microns. The shorter wavelength radiation area was defined as in the range of 0.8 to 30 microns. Sources of radiation were located both above and below the product to be cooked with the end result desired being a complete cooking of the center of the product with only the desired crusting or browning on the outer surface.

In U.S. Pat. No. 4,577,092 a cooking device is described having a removable shroud that can be lowered over the product to be cooked. In this patent the heating element is hingedly attached to the base and resides in the shroud. Therefore, the heating element can be lifted by rotating it backwardly about the hinged attachment of one side thereof to insert or remove food products. This patent describes only a single radiant element located above the product to be cooked.

In U.S. Pat. No. 4,238,669, there is described an oven suited for cooking crusted products wherein two sources of heat energy are provided. A low heat is provided from resistance heaters and a separately controlled source of high heat from quartz lamps is also provided. The high heat is estimated at preferably 1,000° F. per lamp bulb with the low heat coils generating heat at about 500° F.

SUMMARY OF THE INVENTION

It has been discovered that a low wattage infra-red oven can be provided which can be easily adopted to cooking pizza and the like in a tabletop unit. The device of the invention utilizes a directional source of infra-red energy, preferably etched foil emitters disposed both above and below a support for the food product to be cooked and opposed emitters disposed on either side thereof. The device of this invention further includes a motor for rotating the food support so that the side surfaces are uniformly cooked by the side emitters and a linear actuator for adjusting the height of the upper infra-red emitter above the food product to be cooked. It has been discovered that disposition of the upper emitter about 1.5 inches above the food product during cooking is optimal. Accordingly, in order to insert the food to be cooked or remove the food which has been cooked, it is necessary to adjust the height of the upper emitter. Because during the cooking process the heat applied is directional and the infra-red emitters are disposed relative close to the product, sides are not necessary on the oven of this invention. In general the device of this invention uses a separately controlled low power input to each emitter of 7-9 watts per square inch of radiating surface and generates radiation having a wavelength of 4-5 microns.

Etched foil infra-red emitters are preferred because they are of low wattage and do not require a quartz glass panel protector. While wire emitters could be used, they are not nearly as efficient, and generally operate at an infra-red wavelength less than the optimum.

Accordingly, it is an object of this invention to provide an infra-red cooker which provides a lower infra-red energy emitter and an upper emitter along with two opposed side emitters, each separately controlled, wherein food can be cooked at low wattage and with a controlled wavelength.

It is another object of this invention to provide a tabletop oven which can be used, for example, for pizza pies which can be adjusted to the optimum cooking characteristics for the particular pizza pie or other food product which will rapidly and efficiently cook with a minimum power requirement.

It is yet another object of this invention to provide an infra-red oven having a lower heating element which is fixed, and an upper heating element which is moveable vertically and which may be spaced an optimum distance from the surface of the food to be cooked, the oven further including right and left heating elements for cooking the sides of the food after it is placed on a rotating support within the oven.

These and other objects will become readily apparent with reference to the drawings and following description wherein.

DETAILED DESCRIPTION OF THE INVENTION

Figure 1:
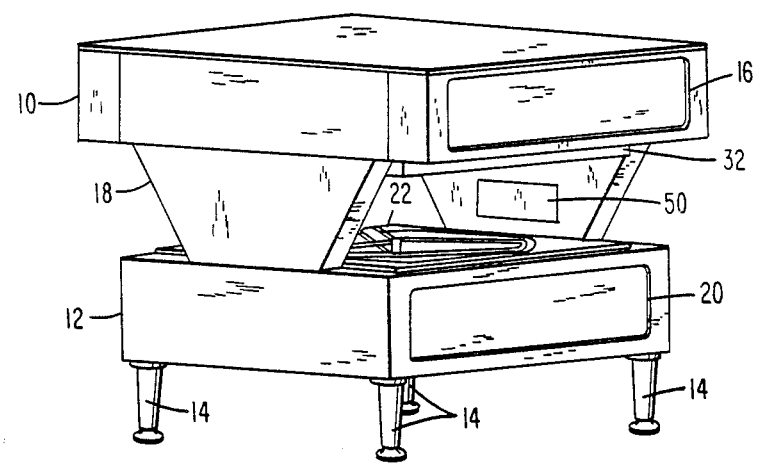
FIG. 1 is a perspective view of the preferred oven of this invention.
Figure 2:
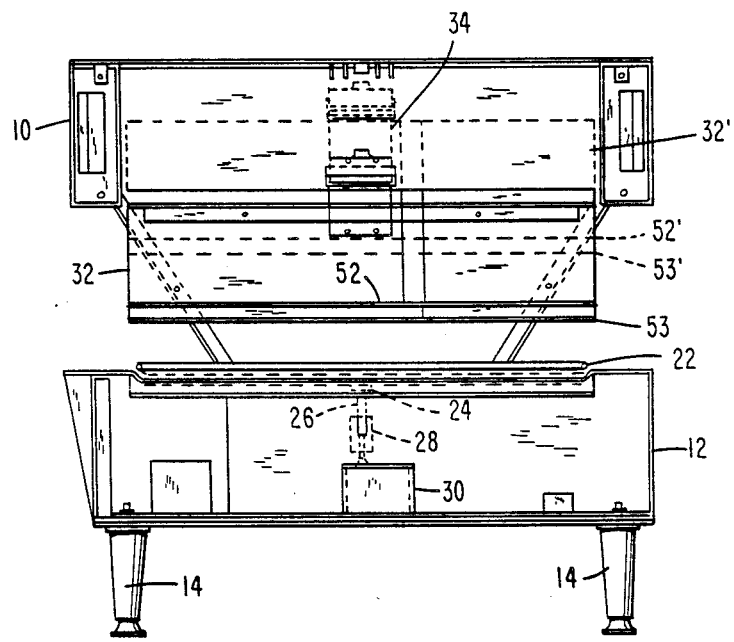
FIG. 2 is a front view of the oven of this invention showing the upper heating element in a lowered position and in a raised position, in phantom.

With attention to FIGS. 1 and 2 the device of the invention includes a top module 10 and a bottom module 12. Module 12 mounts removable legs 14 in the event it is desired to stack units. Top module 10 mounts preferably a graphics display panel 16 and is supported by right and left support members 18.

Bottom module 12 mounts a control panel 20. Preferably, a spider 22 is disposed on the upper surface of lower module 12. Spider 22 may be an open wire device similar to a bull's eye target with circular wires supported by radial wires. Spider 22 is then mounted on hub 24 which is coupled through shaft 26 and coupling 28 to a motor 30. Motor 30 then is designed to rotate spider 22 during the cooking phase preferably one revolution per minute.

Upper module 10 has a downwardly opening shroud 32 disposed therein. Shroud 32 mounts an upper shaft (not shown) which is driven by a linear actuator 34 to raise and lower shroud 32 as desired. A typical linear actuator may be obtained from a variety of sources such as Hurst Manufacturing Division, Emerson Electrical Co., Princeton, Ind., and a preferred version from that company is a synchronous model SL linear actuator.

The heating elements preferred for the device of this invention are etched foil elements obtainable, for example, from Thermal Circuits, Inc., of Salem, Mass. These heaters are preferred because they are low wattage directional heaters and do not require a protective glass or ceramic panel disposed between the heater and the food product to be cooked. Of importance also is the fact that these heaters operate in the middle infra-red range of a wavelength of 3-6 microns which has been discovered as the optimum wavelength for cooking food products. In contrast to prior art disclosures, the device of this invention utilizing the etched foil heaters is intended to cook in the wavelength range of preferably 4 to 5 microns utilizing low power inputs of 7-9 watts per square inch of radiating surface. Longer or shorter wavelengths are not desirable.

Most methods of electric infra-red heat generation for cooking/baking purposes use high watt densities and wavelengths in the short range spectrum of 1.0–2.5 microns. Food products, however, absorb infra-red energy at various wavelengths. For example, water which is found in most foods will absorb considerable infra-red energy at the 2.75-3.0 micron wavelength. However, composite food products, such as pizza pies, contain various other constituents and the overall infra-red energy absorption for baking these products is between 4.20 and 4.9 microns wavelength.

Other types of infra-red sources which could be used and which operate within the power output and frequency range desired are, for example, quartz tubes with nickel-chromium or iron-chromium-aluminum wire elements; or electro-conductive glass-radiating panels —vitreous ceramic radiating panels. As noted above, however, the etched foil does not require a protective quartz glass panel and operates at lower power inputs. Furthermore, as also noted above, the wire emitter is not efficient.

With reference to the drawings, an etched foil emitter or heater 50 is disposed in each side panel 18 facing the spider 22. Although a right side emitter 50 is shown only, a mirror image is presented in the left side panel 18.

Similarly, upper shroud 32 has an etched foil emitter 52. Emitter 52 is spaced slightly above the bottom of the shroud 53. As noted above, the shroud 32 in a raised position is shown in phantom in FIG. 2 with the bottom of the shroud and the emitter also shown in phantom. These elements are identified, respectively as 32', 52' and 53'. With attention to the lower module 12, a similar etched foil emitter 56 is disposed therein below the spider 22. While emitters 52 and 56 are shown as extending across the entire diameter of the spider 22, it will be obvious to those skilled in the art that the emitters can be energized in rings so that if the product to be cooked has a diameter of less than the diameter of the spider, only the emitter rings directly above and below the food product to be cooked will be energized.

Each of the infra-red emitters 50, 52, and 56 are separately controlled as to wattage and wavelength so that the cooking characteristics may be conformed to the type of product cooked. In addition, in the case of, for example, pizza pies, it is intended that the bottom of the shroud 53 should be about 1.5 inches above the upper surface of the pizza during cooking. This has been found to be an optimum spacing for maximizing cooking characteristics.

The following are examples of pizza pie cooking times and wavelengths:

EXAMPLE 1

This pizza was of fresh dough to be baked upon an aluminum screen for a total cooking time of eight minutes. The wavelengths were:

| Top heater | 4.5 microns |
|---|---|
| Side heaters | 3.3 microns |
| Bottom heater | 4.75 and 4.85 microns |

The bottom heater wavelength changed after seven minutes of baking. The total power consumed was 227 watts.

EXAMPLE 2

This example also was a fresh dough pizza baked in a black pizza pan. The total cooking time was nine minutes. The wavelengths were as follows:

| Top heater | 4.85 microns |
|---|---|
| Side heaters | 3.2 microns |
| Bottom heater | 4.60 microns |

EXAMPLE 3

In this example preconditioned dough was baked on an aluminum screen. The total cooking time was six minutes. The wavelengths were as follows:

| Top heater | 4.37 microns |
|---|---|
| Side heaters | 3.50 microns |
| Bottom heater | 4.75 microns |

The total power consumed was 170 watts.

It should be noted that frozen pizza pies because of the ice content within the tomato paste require about ten minutes of baking time.

Figure 3:
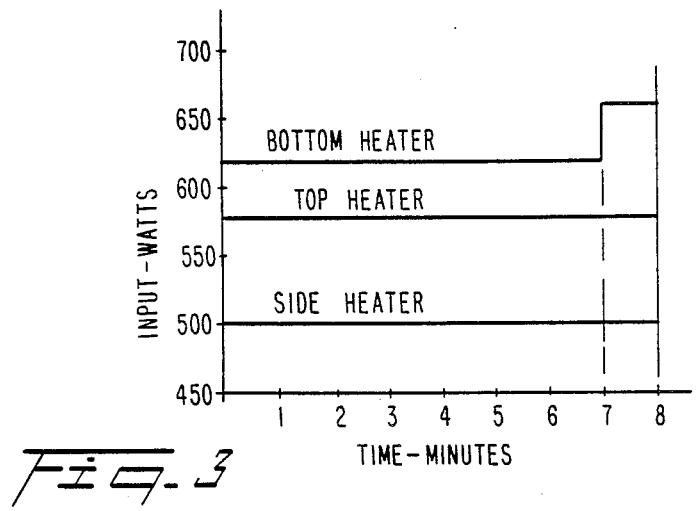
FIG. 3 is a graph depicting a typical cooking cycle for a particular brand of pizza.

With attention to FIG. 3, FIG. 3 is a graph of the heater input versus time for a commercial fresh dough cheese pizza 12 inches in diameter and for the optimal 8 minute bake. With attention to the graph, at 7 minutes the bottom heater was increased in wattage 11 watts for one minute. The total watts then consumed were 227.07 for the 8 minutes. Watts consumed then would be calculated by multiplying the input watts by the time in hours. For a total watts consumed for the cook of 30.28 watt hours.

Figure 4:
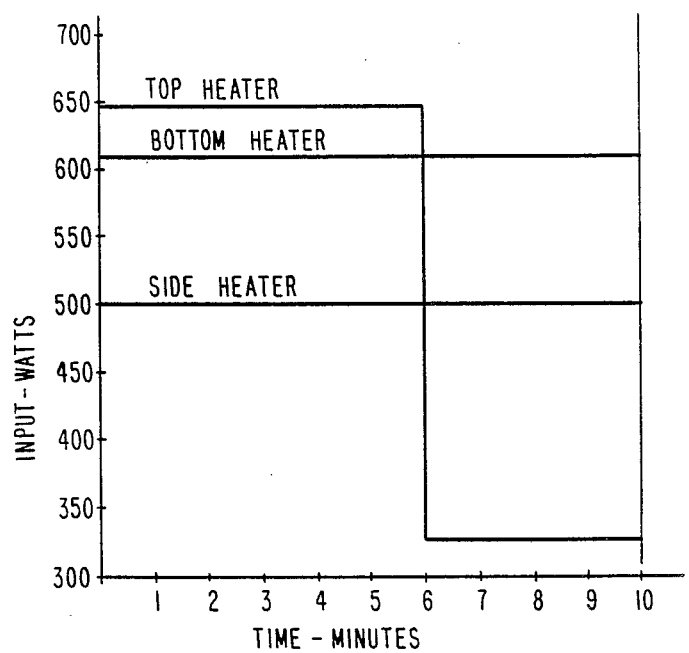
FIG. 4 is a graph depicting the cooking cycle for another brand of pizza.

With reference to FIG. 4, this is also a graph of watt input versus time for a fresh dough cheese pizza of a different commercial version. The pizza was also 12 inches in diameter but was cooked for a total of 10 minutes. At the end of six minutes the top heater was reduced in watt input by 49.4% or from a level of 64.8 watts to 21.9 watts for the first six minutes versus the last four minutes. The total watts then were 271.5 and the watts consumed were 45.26 watt hours.

In summary, a stackable or tabletop infra-red oven is described. The device of this invention utilizes preferably etched foil infra-red emitters operating in the wavelength of three to five and preferably four to five microns with a low power input of seven to nine watts per square inch of radiating surface. Most preferably the wavelength is from 4.20 to 4.9 microns. The device of this invention uses a turntable rotated at preferably one revolution per minute to support the food to be cooked. An etched foil emitter is disposed spaced below the bottom cooking surface and etched foil emitters are mounted on the right and left sides for the purposes of cooking the edges of the food product. The upper surface of the food product to be cooked is subjected to infra-red radiation from an upper emitter mounted in a vertically moveable shroud. The emitter is also an etched foil sheet disposed parallel to the turntable or spider. The shroud is raised to insert the product to be cooked, and then lowered so that the upper emitter is approximately 1.5 inches above the upper surface of the product to be cooked. The upper, lower, and side emitters are then separately controlled in a conventional fashion to conform the cooking characteristics to those optimum for the product to be cooked.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

What is claimed:

1. An oven adapted to cook with low power infra-red radiation having a wavelength of from 3–6 microns comprising:
   a downwardly opening upper module and an upwardly opening lower module; a pair of opposed side plates interconnecting said modules at opposed sides so that said upper module is spaced a predetermined distance above said lower module;
   a shroud disposed above the lower module and linear actuator means coupling said shroud and said upper module for moving said shroud between an upper position disposed within said upper module and a lower position adjacent the opening of said lower module;
   food support means rotatably mounted in said lower module including a flat turntable mounted in the opening of said module for supporting food to be cooked and for rotating said food during cooking;
   first infra-red emitter disposed adjacent, in alignment with, below and parallel to said turntable;
   second infra-red emitter disposed in said shroud, in alignment with and parallel to said turntable; and
   a pair of side infra-red emitters one disposed on the inside surface of each side plate perpendicular to plane intersecting the plane containing said turntable.

2. The oven of claim 1 wherein said emitters are etched foil emitters.

3. The oven of claim 1 wherein the lower position of said shroud disposes said upper emitter about 1.5 inches above the upper surface of food to be cooked when the food is disposed on said turntable.

4. The oven of claim 1 wherein said turntable is rotated by said support means about one revolution per minute during cooking.

5. Method of baking comprising the steps of:
   providing an oven having a rotatable turntable for supporting food to be cooked, and first infra-red radiation emitter disposed below the turntable, a second infra-red emitter disposed above the turntable and a pair of side infra-red emitters disposed on opposite sides of said turntable;
   directing infra-red radiation on the sides, upper and lower surfaces of food to be cooked when supported on said turntable from each of said emitters having a predetermined wavelength of 3–6 microns and a wattage of about 7–9;
   rotating said turntable while directing radiation onto said food while said food cooks.

6. The method of claim 5 wherein said emitters are etched foil emitters.

7. The method of claim 6 wherein the wavelength of the emissions from said upper and lower emitters is 4–5 microns.

8. The method of claim 7 wherein said turntable rotates at about one revolution per minute.

9. The method of claim 8 further comprising:
   providing a vertically moveable shroud disposed over said turntable said shroud mounting said upper emitter therein;
   raising said shroud and placing the food to be cooked on the said turntable and subsequently lowering said shroud until said upper emitter is about 1.5 inches above the upper surface of the food to be cooked before directing radiation onto the food.

* * * * *